(12) United States Patent
Rojas et al.

(10) Patent No.: US 11,971,948 B1
(45) Date of Patent: Apr. 30, 2024

(54) SYSTEM AND METHOD FOR COMMUNICATION BETWEEN RICH INTERNET APPLICATIONS

(71) Applicant: ON24, INC., San Francisco, CA (US)

(72) Inventors: Brent Rojas, San Francisco, CA (US); Jaimini Joshi, San Francisco, CA (US); Mahesh Kheny, San Francisco, CA (US)

(73) Assignee: ON24, INC., San Francisco, CA (US)

( * ) Notice: Subject to any disclaimer, the term of this patent is extended or adjusted under 35 U.S.C. 154(b) by 0 days.

(21) Appl. No.: 16/589,086

(22) Filed: Sep. 30, 2019

Related U.S. Application Data

(63) Continuation of application No. 12/130,310, filed on May 30, 2008, now Pat. No. 10,430,491.

(51) Int. Cl.
*H04L 67/02* (2022.01)
*G06F 17/00* (2019.01)

(52) U.S. Cl.
CPC .............. *G06F 17/00* (2013.01); *H04L 67/02* (2013.01)

(58) Field of Classification Search
CPC ...................................................... H04L 67/02
See application file for complete search history.

(56) References Cited

U.S. PATENT DOCUMENTS

| | | |
|---|---|---|
| 5,220,665 A | 6/1993 | Coyle, Jr. et al. |
| 5,388,197 A | 2/1995 | Rayner |
| 5,420,801 A | 5/1995 | Dockter et al. |
| 5,557,796 A | 9/1996 | Fehskens et al. |
| 5,642,171 A | 6/1997 | Baumgartner et al. |
| 5,680,619 A | 10/1997 | Gudmundson et al. |
| 5,732,216 A | 3/1998 | Logan et al. |
| 5,748,185 A | 5/1998 | Stephan et al. |
| 5,752,244 A | 5/1998 | Rose et al. |

(Continued)

FOREIGN PATENT DOCUMENTS

| | | |
|---|---|---|
| CN | 1500353 A | 5/2004 |
| CN | 103535026 A | 1/2014 |

(Continued)

OTHER PUBLICATIONS

Abla et al., Advanced Tools for enhancing control room collaborations, Fusion Engineering and Design, vol. 81, Issues 15-17, 5th IAEA TM on Control, Data Acquisition, and Remote Participation for Fusion Research—5th IAEA TM, Jul. 2006, pp. 2039-2044 (15 pages), ISSN 0920-3796, DOI: 10.1016/j.jusengdes.200.

(Continued)

*Primary Examiner* — Ryan J Jakovac
(74) *Attorney, Agent, or Firm* — Manatt, Phelps & Phillips, LLP

(57) ABSTRACT

Systems and methods are disclosed for communicating between applications. In one exemplary embodiment, there is provided a system for communicating between applications where the system includes a Rich Internet Application and a control room within a server system The Rich Internet Application broadcasts information to the control room and the control room broadcasts the information to applications connected to the system. Moreover the Rich Internet Application also transmits low priority information to a web application for delayed logging and processing.

11 Claims, 5 Drawing Sheets

(56) References Cited

U.S. PATENT DOCUMENTS

| | | |
|---|---|---|
| 5,801,685 A | 9/1998 | Miller et al. |
| 5,815,154 A | 9/1998 | Hirschtick et al. |
| 5,838,973 A | 11/1998 | Carpenter-Smith et al. |
| 5,861,906 A | 1/1999 | Dunn et al. |
| 5,892,915 A | 4/1999 | Duso et al. |
| 5,929,850 A | 7/1999 | Broadwin et al. |
| 5,996,015 A | 11/1999 | Day et al. |
| 6,006,332 A | 12/1999 | Rabne et al. |
| 6,008,807 A | 12/1999 | Bretschneider et al. |
| 6,009,458 A | 12/1999 | Hawkins et al. |
| 6,014,706 A | 1/2000 | Cannon et al. |
| 6,058,424 A | 5/2000 | Dixon et al. |
| 6,097,441 A | 8/2000 | Allport |
| 6,108,645 A | 8/2000 | Eichstaedt et al. |
| 6,141,595 A | 10/2000 | Gloudeman et al. |
| 6,155,840 A | 12/2000 | Sallette |
| 6,157,809 A | 12/2000 | Kaqmbayashi |
| 6,223,292 B1 | 4/2001 | Dean et al. |
| 6,253,368 B1 | 6/2001 | Nelin et al. |
| 6,324,683 B1 | 11/2001 | Fuh et al. |
| 6,366,916 B1 | 4/2002 | Baer et al. |
| 6,396,500 B1 | 5/2002 | Qureshi et al. |
| 6,404,978 B1 | 6/2002 | Abe |
| 6,445,834 B1 | 9/2002 | Rising, III et al. |
| 6,452,609 B1 | 9/2002 | Katinsky et al. |
| 6,473,749 B1 | 10/2002 | Smith et al. |
| 6,523,022 B1 | 2/2003 | Hobbs |
| 6,535,909 B1 | 3/2003 | Rust |
| 6,538,665 B2 | 3/2003 | Crow et al. |
| 6,546,405 B2 | 4/2003 | Gupta et al. |
| 6,560,637 B1 | 5/2003 | Dunlap et al. |
| 6,601,026 B2 | 7/2003 | Appelt et al. |
| 6,628,279 B1 | 9/2003 | Schell et al. |
| 6,629,065 B1 | 9/2003 | Gadh et al. |
| 6,636,237 B1 | 10/2003 | Murray et al. |
| 6,636,888 B1 | 10/2003 | Bookspan et al. |
| 6,657,543 B1 | 12/2003 | Chung |
| 6,697,805 B1 | 2/2004 | Choquier et al. |
| 6,714,909 B1 | 3/2004 | Gibbon et al. |
| 6,715,126 B1 | 3/2004 | Chang et al. |
| 6,728,753 B1 | 4/2004 | Parasnis et al. |
| 6,745,344 B1 | 6/2004 | Gibbon et al. |
| 6,748,382 B1 | 6/2004 | Mohan et al. |
| 6,795,972 B2 | 9/2004 | Rovira |
| 6,801,224 B1 | 10/2004 | Chang et al. |
| 6,834,308 B1 | 12/2004 | Ikezoye et al. |
| 6,842,175 B1 | 1/2005 | Schmalstieg et al. |
| 6,850,944 B1 | 2/2005 | MacCall et al. |
| 6,859,838 B1 | 2/2005 | Puranik et al. |
| 6,877,023 B1* | 4/2005 | Maffeis .................. H04L 51/066 |
| | | 709/202 |
| 6,920,181 B1 | 7/2005 | Porter |
| 7,062,722 B1 | 6/2006 | Carlin et al. |
| 7,079,990 B2 | 7/2006 | Haller et al. |
| 7,096,416 B1 | 8/2006 | Smith et al. |
| 7,103,770 B2 | 9/2006 | Conrath |
| 7,146,329 B2 | 12/2006 | Conkwright et al. |
| 7,168,035 B1 | 1/2007 | Bell et al. |
| 7,188,186 B1 | 3/2007 | Meyer et al. |
| 7,281,034 B1 | 10/2007 | Eyal |
| 7,281,060 B2 | 10/2007 | Hofmann et al. |
| 7,290,057 B2 | 10/2007 | Suanders et al. |
| 7,296,137 B2 | 11/2007 | Moyer |
| 7,313,595 B2 | 12/2007 | Rust |
| 7,330,875 B1 | 2/2008 | Parasnis et al. |
| 7,349,944 B2 | 3/2008 | Vernon |
| 7,350,231 B2 | 3/2008 | Madison et al. |
| 7,363,372 B2 | 4/2008 | Potenzone et al. |
| 7,370,269 B1 | 5/2008 | Prabhu et al. |
| 7,415,529 B2 | 8/2008 | Saunders et al. |
| 7,418,431 B1 | 8/2008 | Nies et al. |
| 7,441,201 B1 | 10/2008 | Printezis |
| 7,454,708 B2 | 11/2008 | O'Neal et al. |
| 7,559,055 B2 | 7/2009 | Yang et al. |
| 7,561,178 B2 | 7/2009 | Baartman et al. |
| 7,590,945 B2 | 9/2009 | Sims et al. |
| 7,711,722 B1 | 5/2010 | Sahasi et al. |
| 7,712,052 B2 | 5/2010 | Szeliski et al. |
| 7,873,638 B2 | 1/2011 | Young et al. |
| 8,234,336 B2 | 7/2012 | Slater et al. |
| 8,392,821 B2 | 3/2013 | DeMarco et al. |
| 8,443,041 B1* | 5/2013 | Krantz .................. H04L 51/04 |
| | | 709/204 |
| 8,447,664 B1 | 5/2013 | Pape et al. |
| 8,682,672 B1 | 3/2014 | Ha et al. |
| 8,682,969 B1 | 3/2014 | Sahasi et al. |
| 8,706,812 B2 | 4/2014 | Sahasi et al. |
| 8,798,252 B2 | 8/2014 | Krantz et al. |
| 9,046,995 B2 | 6/2015 | Garland |
| 9,135,312 B2 | 9/2015 | Greenspan et al. |
| 9,148,480 B2 | 9/2015 | Sahasi et al. |
| 9,224,173 B2 | 12/2015 | Arora et al. |
| 9,553,922 B1 | 1/2017 | Guarraci et al. |
| 9,720,577 B1 | 8/2017 | Sahasi |
| 9,892,028 B1 | 2/2018 | Garland |
| 9,973,576 B2 | 5/2018 | Sahasi et al. |
| 10,430,491 B1 | 10/2019 | Joshi et al. |
| 10,785,325 B1 | 9/2020 | Baishya et al. |
| 2001/0027420 A1 | 10/2001 | Boublik et al. |
| 2001/0032242 A1 | 10/2001 | Terahama et al. |
| 2001/0032305 A1 | 10/2001 | Barry |
| 2002/0016788 A1 | 2/2002 | Burridge |
| 2002/0026323 A1 | 2/2002 | Sakaguchi et al. |
| 2002/0059342 A1 | 5/2002 | Gupta et al. |
| 2002/0065635 A1 | 5/2002 | Lei et al. |
| 2002/0078150 A1 | 6/2002 | Thompson et al. |
| 2002/0085029 A1 | 7/2002 | Ghani |
| 2002/0087496 A1 | 7/2002 | Stirpe et al. |
| 2002/0107673 A1 | 8/2002 | Haller et al. |
| 2002/0112031 A1 | 8/2002 | Franklin et al. |
| 2002/0112155 A1 | 8/2002 | Martherus et al. |
| 2002/0112247 A1 | 8/2002 | Horner et al. |
| 2002/0122050 A1 | 9/2002 | Sandberg |
| 2002/0133719 A1 | 9/2002 | Westerdal |
| 2002/0143901 A1 | 10/2002 | Lupo et al. |
| 2002/0152278 A1 | 10/2002 | Pontenzone et al. |
| 2002/0193895 A1 | 12/2002 | Qian et al. |
| 2003/0004791 A1 | 1/2003 | Kojima |
| 2003/0005019 A1 | 1/2003 | Pabla et al. |
| 2003/0005465 A1 | 1/2003 | Connely |
| 2003/0014521 A1 | 1/2003 | Elson et al. |
| 2003/0025650 A1 | 2/2003 | Uesaki et al. |
| 2003/0037131 A1 | 2/2003 | Verma |
| 2003/0061280 A1 | 3/2003 | Bulson et al. |
| 2003/0061330 A1 | 3/2003 | Frisco et al. |
| 2003/0071810 A1 | 4/2003 | Shoov et al. |
| 2003/0086682 A1 | 5/2003 | Schofield et al. |
| 2003/0101091 A1 | 5/2003 | Levin et al. |
| 2003/0115267 A1 | 6/2003 | Hinton et al. |
| 2003/0154277 A1 | 8/2003 | Haddad et al. |
| 2003/0156135 A1 | 8/2003 | Lucarelli |
| 2003/0167315 A1 | 9/2003 | Chowdhry et al. |
| 2003/0174160 A1 | 9/2003 | Deutscher et al. |
| 2003/0204566 A1 | 10/2003 | Dhupelia et al. |
| 2004/0024898 A1 | 2/2004 | Wan |
| 2004/0030787 A1 | 2/2004 | Jandel et al. |
| 2004/0032424 A1 | 2/2004 | Florschuetz |
| 2004/0039834 A1 | 2/2004 | Saunders et al. |
| 2004/0049539 A1* | 3/2004 | Reynolds .................. G06F 3/165 |
| | | 709/203 |
| 2004/0054542 A1 | 3/2004 | Foote et al. |
| 2004/0059941 A1 | 3/2004 | Hardman et al. |
| 2004/0073629 A1 | 4/2004 | Bazot et al. |
| 2004/0098754 A1 | 5/2004 | Vella et al. |
| 2004/0103150 A1 | 5/2004 | Ogdon et al. |
| 2004/0125877 A1 | 7/2004 | Chang et al. |
| 2004/0143603 A1 | 7/2004 | Kaufmann et al. |
| 2004/0148375 A1 | 7/2004 | Levett et al. |
| 2004/0153504 A1 | 8/2004 | Hutchinson et al. |
| 2004/0162787 A1 | 8/2004 | Madison et al. |
| 2004/0167896 A1 | 8/2004 | Eakin |
| 2004/0187140 A1 | 9/2004 | Aigner et al. |
| 2004/0237120 A1 | 11/2004 | Lewin et al. |
| 2004/0243928 A1 | 12/2004 | Hesmer et al. |

(56) References Cited

U.S. PATENT DOCUMENTS

| | | |
|---|---|---|
| 2004/0268224 A1 | 12/2004 | Balkus et al. |
| 2005/0015719 A1 | 1/2005 | Marchon et al. |
| 2005/0039131 A1 | 2/2005 | Paul |
| 2005/0093860 A1 | 5/2005 | Yanagisawa et al. |
| 2005/0138560 A1 | 6/2005 | Lee et al. |
| 2005/0144258 A1 | 6/2005 | Burckart et al. |
| 2005/0183143 A1 | 8/2005 | Anderholm et al. |
| 2005/0204148 A1 | 9/2005 | Mayo et al. |
| 2005/0212797 A1 | 9/2005 | Lee et al. |
| 2005/0223340 A1 | 10/2005 | Repka |
| 2005/0223341 A1 | 10/2005 | Repka |
| 2005/0223342 A1 | 10/2005 | Repka et al. |
| 2005/0278650 A1 | 12/2005 | Sims et al. |
| 2005/0288001 A1 | 12/2005 | Foster et al. |
| 2006/0005114 A1 | 1/2006 | Williamson et al. |
| 2006/0031914 A1 | 2/2006 | Dakss et al. |
| 2006/0048058 A1 | 3/2006 | O'Neal et al. |
| 2006/0106780 A1 | 5/2006 | Degan |
| 2006/0129933 A1 | 6/2006 | Land et al. |
| 2006/0150149 A1 | 7/2006 | Chandhoke et al. |
| 2006/0167896 A1 | 7/2006 | Kapur et al. |
| 2006/0235973 A1 | 10/2006 | McBride et al. |
| 2006/0265495 A1 | 11/2006 | Butler et al. |
| 2006/0277553 A1 | 12/2006 | Henning et al. |
| 2007/0038931 A1 | 2/2007 | Allaire et al. |
| 2007/0055401 A1 | 3/2007 | Van Bael et al. |
| 2007/0121850 A1 | 5/2007 | Klos et al. |
| 2007/0174905 A1 | 7/2007 | Martherus et al. |
| 2007/0192613 A1 | 8/2007 | Amoroso et al. |
| 2007/0192727 A1 | 8/2007 | Finley et al. |
| 2007/0211065 A1 | 9/2007 | Feth et al. |
| 2007/0245243 A1 | 10/2007 | Lanza et al. |
| 2007/0271367 A1 | 11/2007 | Yardeni et al. |
| 2007/0282858 A1 | 12/2007 | Arner et al. |
| 2008/0005240 A1 | 1/2008 | Knighton et al. |
| 2008/0005247 A9 | 1/2008 | Khoo |
| 2008/0028341 A1 | 1/2008 | Szeliski et al. |
| 2008/0062969 A1 | 3/2008 | Picard et al. |
| 2008/0062970 A1 | 3/2008 | Picard et al. |
| 2008/0086456 A1 | 4/2008 | Rasanen et al. |
| 2008/0109396 A1 | 5/2008 | Kacin |
| 2008/0120336 A1 | 5/2008 | Bergman et al. |
| 2008/0162206 A1 | 7/2008 | Mak et al. |
| 2008/0189162 A1 | 8/2008 | Ganong et al. |
| 2008/0201736 A1 | 8/2008 | Gordon et al. |
| 2008/0235189 A1* | 9/2008 | Rayman .............. G06F 16/9535 |
| 2008/0270151 A1 | 10/2008 | Mahoney et al. |
| 2008/0276271 A1 | 11/2008 | Anderson et al. |
| 2009/0013244 A1 | 1/2009 | Cudich et al. |
| 2009/0019367 A1 | 1/2009 | Cavagnari et al. |
| 2009/0044138 A1 | 2/2009 | Rudolph et al. |
| 2009/0049385 A1 | 2/2009 | Blinnikka et al. |
| 2009/0066366 A1 | 3/2009 | Solomon |
| 2009/0083641 A1 | 3/2009 | Christy |
| 2009/0094520 A1 | 4/2009 | Kulas |
| 2009/0094544 A1 | 4/2009 | Savage |
| 2009/0100372 A1 | 4/2009 | Lauridsen et al. |
| 2009/0133048 A1 | 5/2009 | Gibbs et al. |
| 2009/0138508 A1 | 5/2009 | Tolle et al. |
| 2009/0171968 A1 | 7/2009 | Kane et al. |
| 2009/0172021 A1 | 7/2009 | Kane et al. |
| 2009/0172597 A1 | 7/2009 | Mercer |
| 2009/0187825 A1 | 7/2009 | Sandquist et al. |
| 2009/0217187 A1 | 8/2009 | Kendall et al. |
| 2009/0222842 A1 | 9/2009 | Narayanan et al. |
| 2009/0259937 A1 | 10/2009 | Rohall et al. |
| 2009/0287790 A1* | 11/2009 | Upton .............. H04N 7/17318 |
| | | 709/208 |
| 2009/0292584 A1 | 11/2009 | Dalal et al. |
| 2009/0292768 A1 | 11/2009 | Franke |
| 2010/0023849 A1 | 1/2010 | Hakim et al. |
| 2010/0037205 A1 | 2/2010 | Maillot et al. |
| 2010/0057415 A1 | 3/2010 | Chu et al. |
| 2010/0189131 A1 | 7/2010 | Branam et al. |
| 2010/0192132 A1 | 7/2010 | Yuan et al. |
| 2010/0216443 A1 | 8/2010 | Jacobstein et al. |
| 2010/0251174 A1 | 9/2010 | Belandrino et al. |
| 2010/0277696 A1 | 11/2010 | Huebner |
| 2010/0325674 A1 | 12/2010 | Liu |
| 2011/0010307 A1 | 1/2011 | Bates et al. |
| 2011/0026898 A1 | 2/2011 | Lussier et al. |
| 2011/0035431 A1* | 2/2011 | Geary .............. H04L 67/04 |
| | | 709/203 |
| 2011/0055176 A1 | 3/2011 | Choi et al. |
| 2011/0082719 A1 | 4/2011 | Dutta |
| 2011/0191316 A1 | 8/2011 | Lai et al. |
| 2011/0225015 A1 | 9/2011 | Spivack et al. |
| 2011/0252094 A1 | 10/2011 | Sahasi et al. |
| 2011/0276372 A1 | 11/2011 | Spivack et al. |
| 2011/0289422 A1 | 11/2011 | Spivack et al. |
| 2012/0048298 A1 | 3/2012 | Humphrey et al. |
| 2012/0084292 A1 | 4/2012 | Liang et al. |
| 2012/0109966 A1 | 5/2012 | Liang et al. |
| 2012/0130771 A1 | 5/2012 | Kannan et al. |
| 2012/0158902 A1 | 6/2012 | Udtke et al. |
| 2012/0191716 A1 | 7/2012 | Omoigui |
| 2012/0210247 A1 | 8/2012 | Khouri et al. |
| 2012/0226984 A1 | 9/2012 | Bastide et al. |
| 2012/0246137 A1 | 9/2012 | Sallakonda et al. |
| 2012/0254454 A1 | 10/2012 | Margush et al. |
| 2012/0290399 A1 | 11/2012 | England et al. |
| 2012/0290950 A1 | 11/2012 | Rapaport et al. |
| 2012/0310750 A1 | 12/2012 | Schutzbank et al. |
| 2013/0036191 A1 | 2/2013 | Fink et al. |
| 2013/0132374 A1 | 5/2013 | Olstad et al. |
| 2013/0138585 A1 | 5/2013 | Forte |
| 2013/0215116 A1 | 8/2013 | Siddique et al. |
| 2013/0268872 A1 | 10/2013 | Yin et al. |
| 2013/0282611 A1 | 10/2013 | Avedissian et al. |
| 2014/0068779 A1 | 3/2014 | Tan et al. |
| 2014/0115466 A1 | 4/2014 | Barak et al. |
| 2014/0123014 A1 | 5/2014 | Keen |
| 2014/0126714 A1 | 5/2014 | Sayko |
| 2014/0126715 A1 | 5/2014 | Lum et al. |
| 2014/0136528 A1 | 5/2014 | Anima et al. |
| 2014/0214691 A1 | 7/2014 | Morris, III |
| 2014/0229839 A1 | 8/2014 | Lynch et al. |
| 2014/0237381 A1 | 8/2014 | Socolof |
| 2014/0279049 A1 | 9/2014 | Wiseman et al. |
| 2014/0289326 A1 | 9/2014 | McCormack et al. |
| 2014/0366098 A1 | 12/2014 | Savage et al. |
| 2014/0372468 A1 | 12/2014 | Collins et al. |
| 2015/0002619 A1 | 1/2015 | Johnston et al. |
| 2015/0006610 A1 | 1/2015 | Johnston et al. |
| 2015/0082021 A1 | 3/2015 | Mandyann et al. |
| 2015/0199411 A1 | 7/2015 | Greenspan et al. |
| 2015/0213145 A1 | 7/2015 | Baldwin et al. |
| 2015/0213361 A1 | 7/2015 | Gamon et al. |
| 2015/0278363 A1 | 10/2015 | Briere et al. |
| 2015/0304367 A1 | 10/2015 | Chan et al. |
| 2015/0365244 A1 | 12/2015 | Schmiltz et al. |
| 2016/0011729 A1 | 1/2016 | Flores et al. |
| 2016/0028790 A1 | 1/2016 | Eriksson et al. |
| 2016/0180248 A1 | 6/2016 | Regan |
| 2017/0046374 A1 | 2/2017 | Fletcher et al. |
| 2017/0064358 A1 | 3/2017 | Sullivan et al. |
| 2017/0097743 A1 | 4/2017 | Hameed et al. |
| 2017/0140398 A1 | 5/2017 | Fleischman et al. |
| 2017/0243255 A1 | 8/2017 | Sahasi et al. |
| 2017/0255696 A1 | 9/2017 | Pulitzer |
| 2018/0033051 A1 | 2/2018 | Maynard et al. |
| 2018/0211285 A1 | 7/2018 | Todasco et al. |
| 2018/0262561 A1 | 9/2018 | Sahasi et al. |
| 2018/0293610 A1 | 10/2018 | Maynard |
| 2019/0108234 A1 | 4/2019 | Torres et al. |
| 2019/0108438 A1 | 4/2019 | Torres et al. |
| 2020/0267110 A1 | 8/2020 | Nolan et al. |
| 2020/0382583 A1 | 12/2020 | Sahasi et al. |

FOREIGN PATENT DOCUMENTS

| | | |
|---|---|---|
| EP | 2261898 A1 | 12/2010 |
| KR | 20100003117 A | 1/2010 |
| WO | WO02082815 A1 | 10/2002 |

(56) References Cited

FOREIGN PATENT DOCUMENTS

| WO | WO02093352 A1 | 11/2002 |
| WO | WO02097616 A1 | 12/2002 |
| WO | WO2009020770 A1 | 2/2009 |

OTHER PUBLICATIONS

Guthery et al.,—"How to turn a GSM SIM into a web server" projecting mobile trust onto the Worldwide Web—In Proceedings of the Fourth Working Conference on Smart Card Research and Advanced Applications on Smart Card Research and Advanced Applications, Bristol, United Kingdom (13 pages).

Holmberg et al., "Web Real-Time Communication Use Cases and Requirements"; Internet Engineering Task Force (IETF), dated Mar. 2015 (29 pages).

Draft-C., Holmberg et al., "Web Real-Time Communication Use Cases and Requirements", RTCWEV Working Group, dated Oct. 14, 2013 (25 pages).

Saint-Andre, P. 2005. Streaming XML with Jabber/XMPP. IEEE Internet Computing 9, Apr. 27, 2005, 6 pages. (Sep. 2005)

Sen, Sandip, "An Automated Distributed Meeting Scheduler, PSU," Apr. 2007, 13 pages. http://citeseerx.ist.psu.edu/viewdoc/summary?doi=10.1.1.56.6862.

Sinha et al., "Video Conferencing System," Columbia University, 11 pages. http://www.cs.columbia.edu/~sedwards/classes/2009/4840/reports/RVD-presentation.pdf.

On24, "Best practices in Webcasting for Publishing" dated 2006, 16 pages.

Weiser, "Microsoft PowerPoint 2003—Table of Contents, ITM Online Help Collection, UWEC," University of Wisconsin, Eau Claire entitled dated Sep. 19, 2004, (2 pages). archived located @http://web.archive.org/web/20040919191008/http://www.uwec.edu/help/ppoint03.htm.

Weiser, Microsoft PowerPoint 2003 Viewing Online Presentations: The Environment, UWEC—University of Wisconsin, Eau Claire archived dated Dec. 21, 2004, (2 pages). located @http://web.archive.org/web/20041221201404/www.uwec.edu/help/PPoint03/webenvir.htm.

Microsoft Corporation—"COM: Component Object Model Technologies"—archived dated Oct. 23, 2004, 2 pages. located @http://web.archive.org/web/20041023025124/http://www.microsoft.com/com/default.mspx.

Rothganger et al., "3D Object Modeling and Recognition Using Local Affine-Invariant Image Descriptors and Multi-View Spatial Constraints," Department of Computer Science and Beckman Institute, University of Illinois-Cordelia Schmid Inria, France—International Journal of Computer Vision 66(3), 231-259, 2006 (29 pages).

Papadakis et al., "Efficient 3D shape matching and retrieval using a concrete radialized spherical projection representation"—The Journal of the Pattern Recognition Society 40 dated 2007 p. 2437-2452 (16 pages).

"Breeze Manager User Guide," Copyright © 2005 Macromedia, Inc., Second Edition: Jun. 2005, 306 pages.

"Breeze Meeting User Guide for Meeting Hosts and Presenters", Copyright © 2005 Macromedia, Inc., Third Edition: Sep. 2005, 130 pages.

Freeman et al.,"Creative Collaboration between Audiences and Musicians in Flock," Georgia Tech Center for Music Technology, Feb. 2010, 17 pages. http://distributedmusic.gatech.edu/jason/publications/pdf_files_of_publications/flock-digitalcreativity.pdf.

Suduc et al., "Exploring Multimedia Web Conferencing," Valahia University of Targoviste, Exploring Multimedia Web Conferencing (Year: 2009), Mar. 2009, 14 pages. https://www.researchgate.net/profile/Suduc_Ana-Maria/publication/2684938.

Marni Gunther, "Webcasting 101: Online Broadcasting in the Meetings and Events Industry", Netbriefings, Inc., Jul. 2008, 2 pages. http://www.netbriefings.com/pdf/0807-MtgsMNHospitality.pdf.

Ebner, et al.; "First steps towards an integration of a Personal Learning Environment at university level", Jan. 1, 2011, 15 pages.

Berthold et al., "Psycho-pedagogical Mash-Up Design for Personalizing the Learning Environment", Knowledge Management Institute, Graz University of Technology, Austria, Jul. 11, 2011, 15 pages.

Aguiar, Everaldo, et al., "Engagement vs performance: using electronic portfolios to predict first semester engineering student retention." Proceedings of the Fourth International Conference on Learning Analytics and Knowledge. 2014: 103-112 (Year: 2014), 10 pages.

Navarathna, Rajitha, et al.,"Estimating audience engagement to predict movie ratings." IEEE Transactions on Affective Computing 10.1 (Jul. 3, 2017): 48-59. (Year: 2017), 12 pages.

Sam Dutton, "Get Started with WebRTC", published Jul. 23, 2012 (updated: Nov. 24, 2020), 24 pages. https://www.html5rocks.com/en/tutorials/webrtc/basics/.

* cited by examiner

SYSTEM AND METHOD FOR COMMUNICATION BETWEEN RICH INTERNET APPLICATIONS

FIELD

The invention relates generally to Rich Internet Applications that require custom communications with one another and to management of content used by these applications.

BACKGROUND

Rich Internet Applications are applications that communicate with one another. Part of the management of Rich Internet Applications includes dealing with the demand for constant communication between applications, dealing with any requirements for low latency or real time communications, and content issues. The content issues are especially relevant with client-side content, where the client side content of the Rich Internet Application is updated frequently in response to instructions from a server component.

Current solutions may rely on proprietary server/client frameworks that require licensing or have difficulty scaling. Another current solution relies on a periodic polling mechanism, where each of a set of distributed web-browser based applications must make repeated requests to the server to get the information about the other users, as well as post their own recent actions.

These solutions suffer from a number of issues. They tend to lack customizability, in that they offer a limited amount of customization in the amount and type of information that can be passed between the web browser based Rich Internet Applications and the server components of the system. The also tend to have speed limitations, in that they do not provide real-time communication between the server and the web-browser-based UIs. The latency, or delay in sending and receiving information provides lower performance. Most current solutions limit the total number of participants to a relatively small number, and lack any method of scaling to larger numbers of users. Some of the current solutions require the installation of a proprietary server module to integrate the messaging protocol, and the use of this proprietary server can limit interoperability with other proprietary or non-proprietary systems. Finally, some of these prior solutions require expensive server components, introducing cost limitations.

There is therefore a need to solve the problem of coordinating the actions of numerous widely distributed web application users. A system and method is needed that integrates Rich Internet Applications while at the same time solving scalability, performance, customizability, interoperability and cost issues.

DETAILED DESCRIPTION OF A PREFERRED EMBODIMENT

Communication is an essential aspect of Rich Internet Applications. The described embodiment of a Rich Internet Application communication system is related to Rich Internet Applications that require custom communications with one another. The described embodiments also relate to management of content used by these applications. The innovations herein integrate Rich Internet Applications and improve scalability, performance, customizability, interoperability and cost issues.

Figure 1:
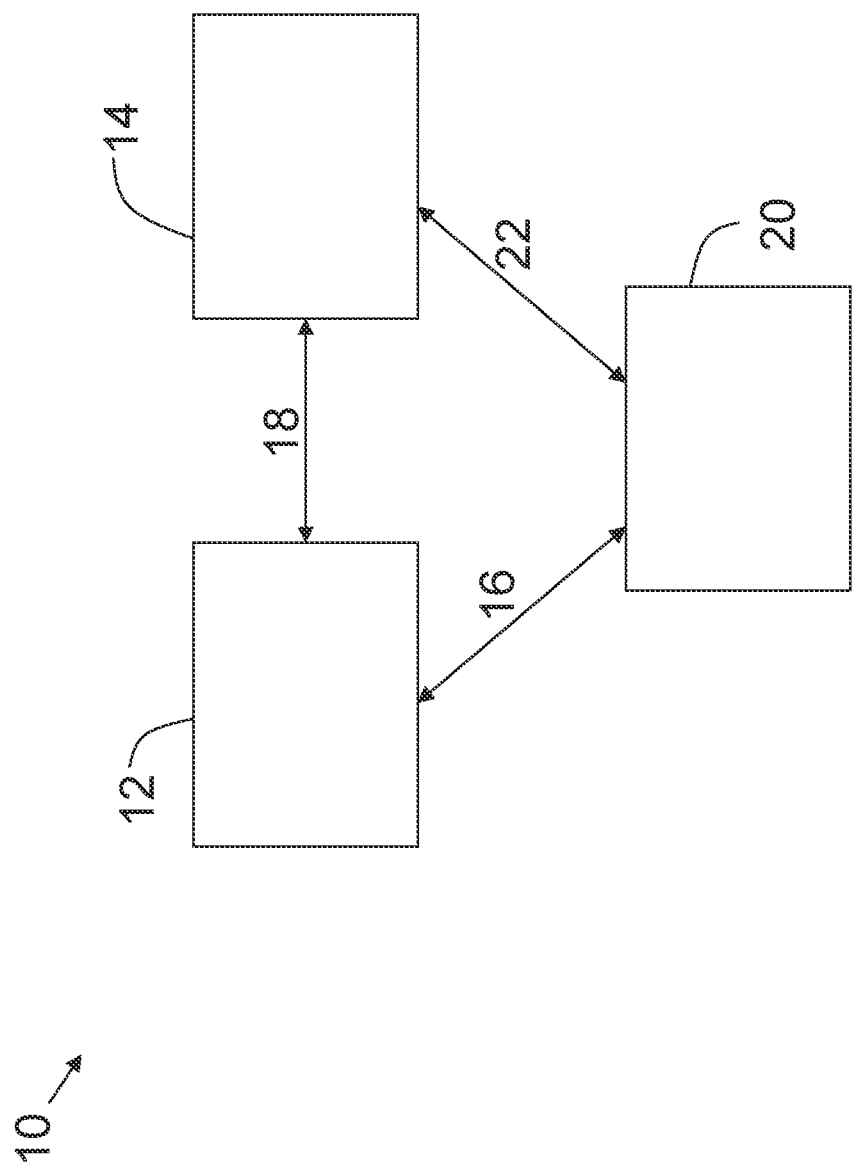
FIG. 1 is a diagram illustrating an example of a Rich Internet Application communication system.

FIG. 1 is a diagram illustrating communication system 10. Rich Internet Application communication system 10 includes server system 12, client application 20, web application 14, web application to server link 18, client application to web application link 22 and client application to server link 16. The use of web application 14 allows the load on server system 12 to be reduced, and saves CPU cycles for the end user facing application.

Client application 20 is an application that communicates with other applications, and is typically referred to as a Rich Internet Application. Client application 20 may run on a home computer, a network enabled phone, a personal data assistant, or another device capable of connecting Rich Internet Applications to each other.

Web application 14 is an application that performs archiving and audit trail maintenance, among other functions. Web application 14 cues messages that are not urgent and that may be delayed without impacting the performance of communication system 10.

Server system 12 contains multiple "rooms" to which web application 14 and client application 20 may register and connect, including a control room to which client application 20 must connect. Server system 12 may be made up of a single server, or may comprise multiple networked servers. Server system 12 may be extendable to allow for improved server system performance by adding additional computing power to the system at any time. In one implementation, server system 12 is comprised of a Jabber server running eJabberD. This provides for flexibility and reduces costs by operation under a GNU General Public License. Web application to server link 18, client application to web application link 22 and client application to server link 16 are communication connections between the different segments of the communication system 10. Typically these will be connections of networked processing components through the internet, but they may operate through local area networks, wide area networks, phone networks, satellite communication links, or any other connection for allowing processing components to share information.

Figure 2:
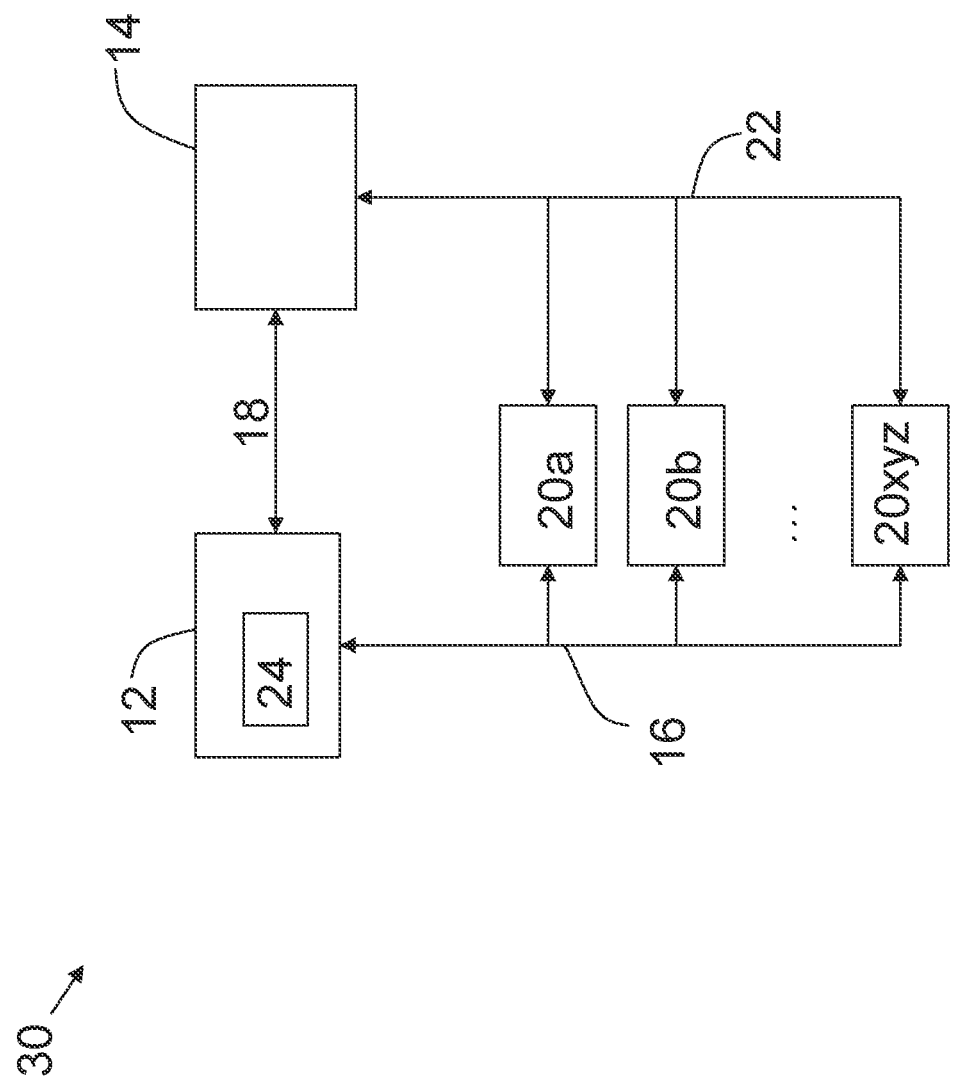
FIG. 2 is a diagram illustrating a Rich Internet Application communication system with multiple applications.

FIG. 2 shows multi-user communication system 30. Multi-user communication system is similar to communication system 10 of FIG. 1. Multi-user communication system 30 includes a scalable number of client applications, shown here as 20a, 20b, and 20xyz. Multi-user communication system 30 also includes server system 12, web application 14, web application to server link 18, client application to web application link 22 and client application to server link 16. Here, server system 12 includes control room 24.

On initial startup of each client application 20, the client application 20 connects to server system 12 and authenticates itself as a valid user or registers as a new user. Each client application must join control room 24 on server system 12. Each client application 20 then broadcasts information to control room 24, allowing all other joined client applications 20 to receive the information. Control room 24 may also be used to push content such as presentation slides, video, or other content to client applications 20.

Figure 3:
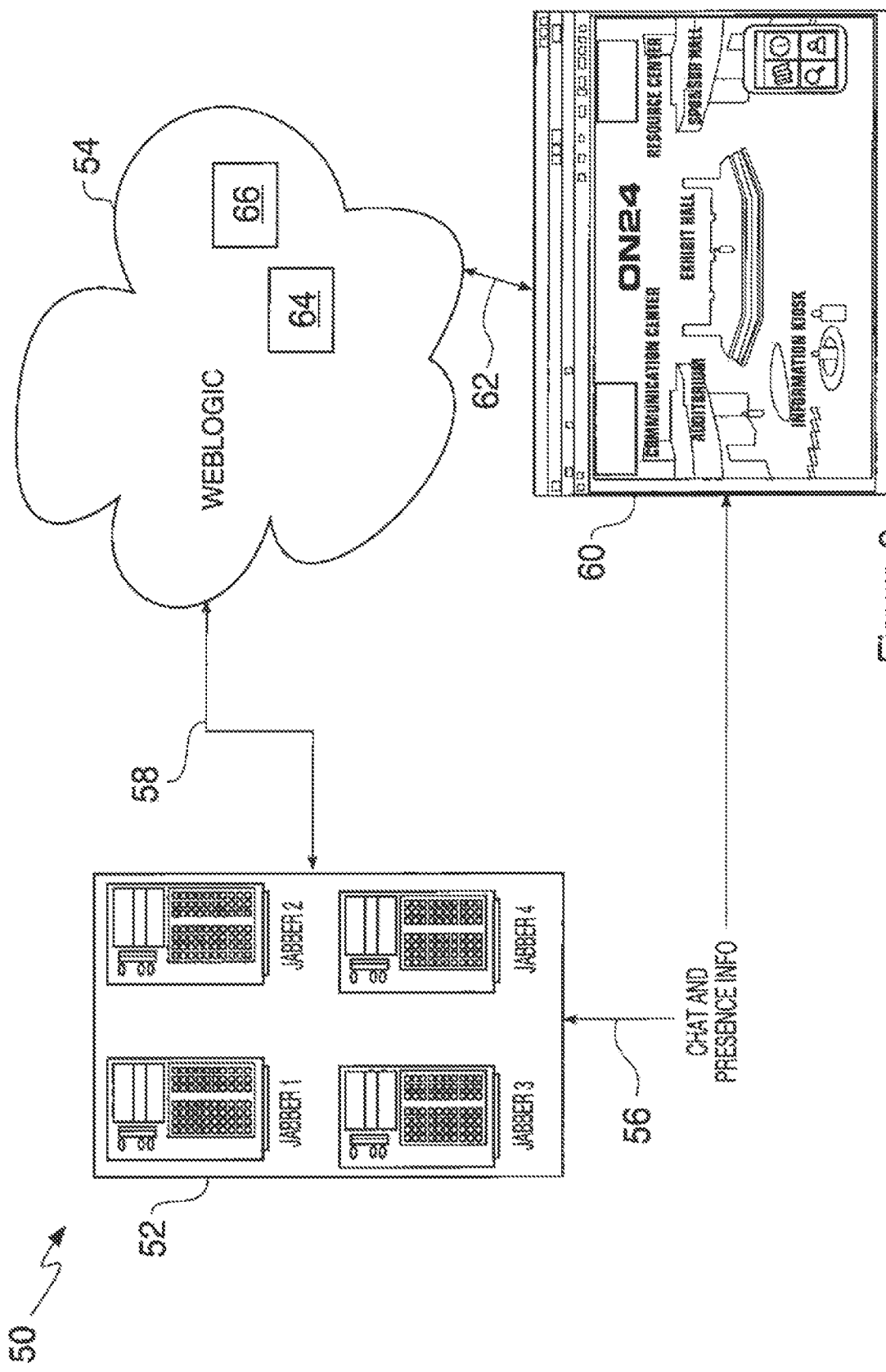
FIG. 3 is an illustration of an implementation of a Rich Internet Application communication system.

FIG. 3 illustrates a specific implementation of a communication system 50. This Rich Internet Application communication system 50 includes jabber server system 52, weblogic 54, Rich Internet Application 60, web application to server link 58, client application to web application link 62 and client application to server link 56.

Jabber server system 52 includes multiple hardware servers running Jabber software such as eJabberD. The servers are networked together, and must contain a control room. They may additionally run presence rooms, chat rooms, and registration interfaces. Jabber server system 52 is connected to Rich Internet Application 60 through client application to server link 56.

Rich Internet Application 60 contains software for interacting with jabber server system 52 for initialization and registration on initial startup of the Rich Internet Application 60. On startup, Rich Internet Application 60 connects to the jabber server system 52 and authenticates itself as a valid user or registers as a new user. This operates as an in-band registration system that may add new users only when needed and actively used, and avoids pre-configuration on jabber server system 52 due to user registrations and logins.

Following authentication, Rich Internet Application 60 must join the control room contained on jabber server system 52. Rich Internet Application 60 may transmit essential information to this control room for the jabber server system 52 and all other applications to see. The control room may also be used to push new content, alerts, and pop-up messages to users.

Rich Internet Application 60 may operate as a virtual world, which refers to an immersive user experience, with navigation and visual interaction taken from 3-Dimensional, real world parallels. Rich Internet Application 60 may set up virtual world environments for the use of businesses and their customers such as virtual tradeshows, job fairs, product demonstration, partner pavilions, conferences. and other uses in a wider range of areas that are readily implemented. Rich Internet Application 60 includes virtual show locations such as virtual exhibit halls, auditoriums, and booths, any of which may provide a user with access to video, audio, or text presentations.

In interacting with jabber server system 52, Rich Internet Application 60 may also use XMPP presence messages to provide a flexible and extensible mechanism for developers to integrate application specific logic for custom user tracking in a virtual environment. Rich Internet Application 60 joins a presence room after authenticating or registering with jabber server system 52. Rich Internet Application 60 then broadcasts XML-based information to this room, allowing jabber server system 52 and other Rich Internet Applications to receive this information. This allows features such as location tracking of a user in a virtual environment, location logging and analysis, and location based content delivery.

Rich Internet Application 60 may also connect to other chat rooms located on jabber server system 52. One chat room may be a special purpose multi-user chat room defined by XMPP to push content to Rich Internet Application 60 and any other connected applications. The central controller in jabber server system 52 may then push new content updates related to the room to Rich Internet Application 60 and other connected applications in the form of XMPP messages containing namespaced xml content. Based on the xml schema, Rich Internet Application 60 carries out the required operation.

Communication system 50 also contains weblogic 54. Weblogic 54 performs archiving and audit trail functionality that is not required to be real time or near real time. Separation of weblogic 54 functions from the communication interaction of Rich Internet Application 60 with rooms in jabber server system 52 allows the load on the server to be reduces and saves CPU cycles for critical time sensitive applications. Delayed information may also be cued and passed through weblogic 54 for the purpose of providing logging and storage compatibility with systems outside of communication system 50.

In one implementation, weblogic 54 consists of an erlang logger 64 and an application server queue 66. The erlang logger 64 collects all required logging packets and periodically sends them to an application server. Erlang logger 64 additionally contains an internal queue to which it will add the packets and then post them on a specified timeout. If the queue hits its full capacity before the timeout, the modules post the packets to the application server. Both the queue size and the timeout values may be configurable. In one possible implementation, HTTP POST mechanisms are used to send information to the application server. Application server queue 66 is present for queuing and processing of logging information. The logging module on the application server parses all the packets and adds them to application server queues based on the type of information contained. One possible implementation of these queues are JMS queues. JMS queues allow flexibility to delay processing beyond the initial delay from erlang logger 64. Additionally, use of JMS queues and application server queue 66 allows for easy moving of logging processes to different physical machines for improved efficiency. The queue for each different type of information may contain a corresponding Message Driven Beans for processing the incoming data.

Figure 4:
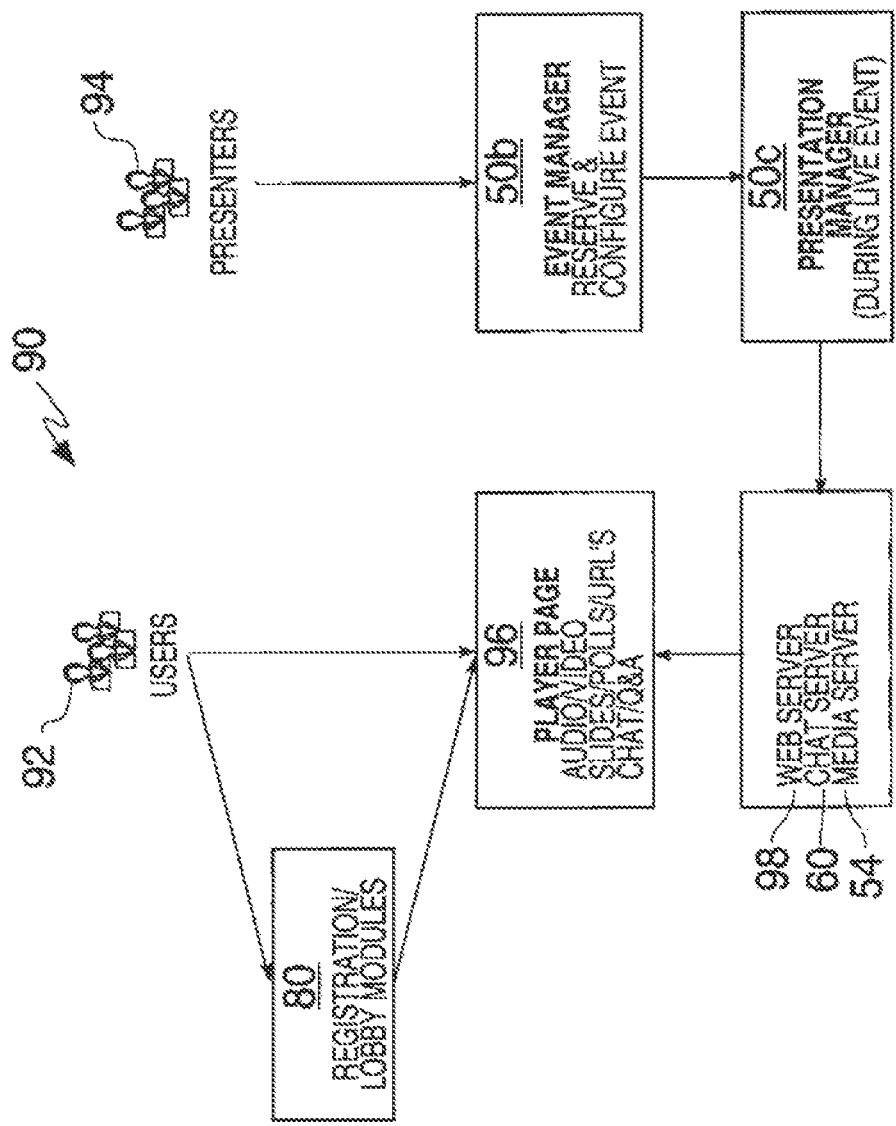
FIG. 4 is a diagram illustrating a presentation workflow for a system including a Rich Internet Application communication system.

FIG. 4 is a diagram illustrating an event center 90 that may be utilized by one or more users 92 that are presented with a presentation by the Rich Internet Application in a system further incorporating the communication system, and one or more presenters 94 who utilize the virtual system to present presentations to the users 92. The users 92 may interact with a registration and lobby modules 80 that permit the users to register with the system and schedule a presentation to view. In response to a successful registration, the user may be presented with a player page 96, such as a web page provided to a client computer of the user, that provides the audio and visual data for the presentation, slides, polls and URLs for the presentation, chat sessions and question and answers for a particular presentation. The data in the player page 96 is provided by the web server 60, the media server 54 and a chat server 98 that provides the chat functionality for a presentation. The presentation data for a live event presentation is provided to the servers 54, 60 and 98 by the presentation manager module 50*c*. The presenters 94 may utilize the event manager module 50*b* to reserve an event and/or configure an event. Once the event is reserve and configured, the presentation data is forwarded to the presentation manager module 50*c*.

Figure 5:
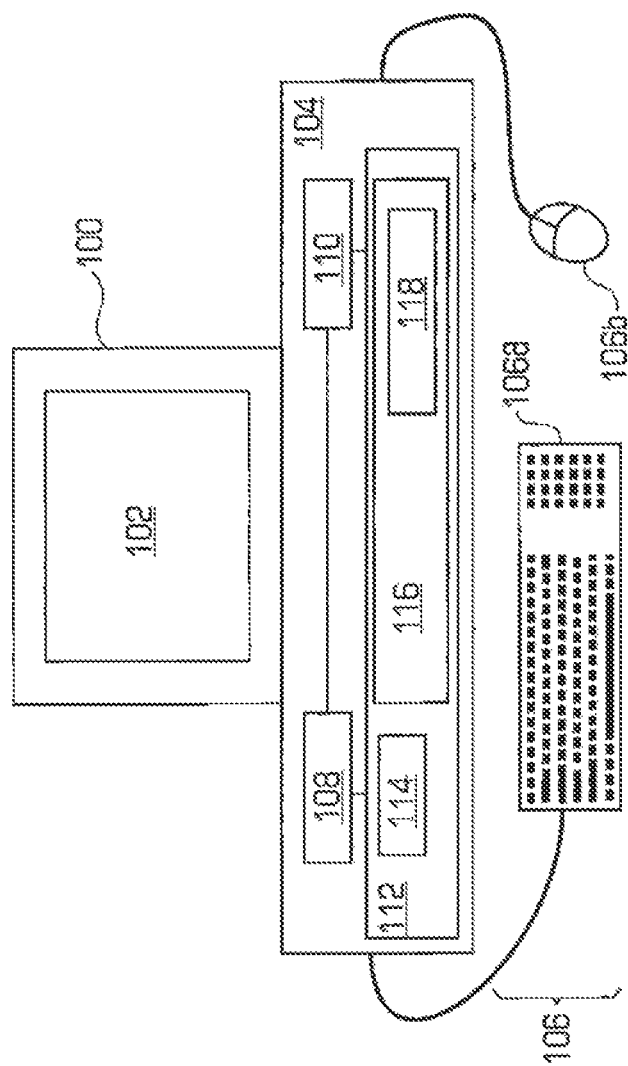
FIG. 5 illustrates an example of a client that may run a Rich Internet Application within a Rich Internet Application communication system.

FIG. 5 is a diagram illustrating an example of an online presentation client 100 that may be used in conjunction with the communication system for running a Rich Internet Application. The event client 100 may be implemented as a personal computer, workstation, PDA, cellular phone and the like with sufficient computing power to implement the functions of the client as described below. In the example shown in FIG. 3, the event client may be a typical personal computer that may further comprise a display unit 102, such as a CRT or liquid crystal display or the like, a chassis 104 and one or more input/output devices 106 that permit a user to interact with the client 100, such as, for example, a keyboard 106a and a mouse 106b. The chassis 104 may further include one or more processors 108, a persistent storage device 110, such as a hard disk drive, optical disk drive, tape drive, etc., and a memory 112, such as SRAM, DRAM or flash memory. In a preferred embodiment, the client is implemented as one or more pieces of software stored in the persistent storage device 110 and then loaded into the memory 112 to be executed by the processor(s) 108. The memory may further include an operating system 114, such as Windows, and a typical browser application 116, such as Microsoft Internet Explorer, Mozilla Firefox or Netscape Navigator and an event console module 118 (including a slide, polls, survey, URL, Q&A) that operates within the browser application. The client side of the system/apparatus is implemented as HTML and Javascript code that is downloaded/streamed to the client 100 during/prior a virtual tradeshow so that the synchronization of the assets does not require separate client software downloaded to the client.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for communicating between applications, comprising:
   one or more Rich Internet Applications coupled to a server system having a processor through a first communication link, wherein each Rich Internet Application includes a virtual show location at which a user can access one of a video, audio and text presentations;
   wherein the one or more Rich Internet Applications are also coupled to a web application through a second link and the web application is coupled to the server system through a third link;
   wherein the server system comprises a control room that receives information from each of the one or more Rich Internet Applications and each of the one or more Rich Internet Applications broadcasts the information to each of the other one or more Rich Internet Applications;
   wherein each Rich Internet Application uses XMPP presence messages to define a location within the virtual show for location tracking of the user in the virtual show; and
   wherein the web application receives a set of low priority data, separated from the information received by the server, from the one or more Rich Internet Applications for logging and storage and the web application is a logger and an queue.

2. The system of claim 1 wherein the server system comprises a single processor.

3. The system of claim 1 wherein the server system comprises an eJabberD server network.

4. The system of claim 3 wherein the queue further comprises an application server queue.

5. The system of claim 4 wherein the logger comprises an erlang logger.

6. The system of claim 4 wherein the web application communicates with an application server via an HTTP POST mechanism.

7. The system of claim 5 wherein the application server queue comprises a JMS queue.

8. The system of claim 1 wherein the server system further comprises a presence room.

9. The system of claim 8 wherein each Rich Internet Application communicates with the presence room using the XMPP presence messages.

10. The system of claim 1 wherein the one or more Rich Internet Applications run on a set of personal computers.

11. The system of claim 1 wherein the one or more Rich Internet Applications run on a set of phones.

* * * * *